US012535909B2

(12) United States Patent
Jo et al.

(10) Patent No.: US 12,535,909 B2
(45) Date of Patent: Jan. 27, 2026

(54) DISPLAY DEVICE

(71) Applicant: LG Display Co., Ltd., Seoul (KR)

(72) Inventors: Jungho Jo, Paju-si (KR); SungChul Kim, Paju-si (KR); Sangkyu Kim, Paju-si (KR); NamYong Gong, Paju-si (KR); HwiDeuk Lee, Paju-si (KR); DeukSu Lee, Paju-si (KR); HoonBae Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/949,432

(22) Filed: Nov. 15, 2024

(65) Prior Publication Data

US 2025/0271958 A1 Aug. 28, 2025

(30) Foreign Application Priority Data

Feb. 26, 2024 (KR) ........................ 10-2024-0027042

(51) Int. Cl.
*G06F 3/041* (2006.01)
*H04R 1/02* (2006.01)

(52) U.S. Cl.
CPC ........... *G06F 3/0416* (2013.01); *H04R 1/025* (2013.01); *H04R 2499/15* (2013.01)

(58) Field of Classification Search
None
See application file for complete search history.

(56) References Cited

U.S. PATENT DOCUMENTS 12,225,358 B2 * 2/2025 Lee .......................... H04R 5/04
2024/0365037 A1 * 10/2024 Kim ...................... H04R 23/00

* cited by examiner

*Primary Examiner* — Stephen T. Reed
(74) *Attorney, Agent, or Firm* — Birch, Stewart, Kolasch & Birch, LLP

(57) ABSTRACT

A display device can include a display panel having a first display area and a second display area, a back plate coupled to a rear surface of the display panel, a first vibration generator disposed in a first back plate area, a second vibration generator disposed in a second back plate area, a plurality of receivers disposed on the back plate, and a touch circuit determining a position of a touch object from a reception vibration signal detected by the plurality of receivers.

20 Claims, 10 Drawing Sheets

(a)

(b)

DISPLAY DEVICE

CROSS-REFERENCE TO RELATED APPLICATION

This application claims priority to Korean Patent Application No. 10-2024-0027042, filed in the Republic of Korea on Feb. 26, 2024, the entire contents of which is hereby expressly incorporated by reference into the present application.

BACKGROUND

Field

Embodiments of the disclosure relate to a display device and, more specifically, to a display device and a display panel capable of touch sensing using a vibration generator that generates vibration.

Discussion of the Related Art

With the development of the information society, various needs for display devices that display images are increasing. As such, various types of display devices, such as liquid crystal displays LCDs, organic light emitting displays OLEDs, etc. are being utilized.

Among these display devices, the organic light emitting display device uses self-emissive organic light emitting diodes, providing advantages, such as a fast response and better contrast ratio, luminous efficiency, luminance, and viewing angle.

The organic light emitting display device can include organic light emitting diodes respectively arranged in a plurality of subpixels disposed on a display panel, and can cause the organic light emitting diodes to emit light by controlling the current flowing to the organic light emitting diodes, thereby displaying images while controlling the brightness of each subpixel.

Generally, a display device displays images through a display panel but, to deliver sound, requires a separate speaker. However, the sound generated through the speaker installed in the display device is not directed to the front surface of the display panel displaying images.

Thus, sound may not properly be delivered toward the viewer who is viewing the image in front of the display panel.

To address the drawbacks, there is ongoing research for a display device having a vibration generator for vibrating the display panel to generate vibration.

SUMMARY OF THE DISCLOSURE

The inventors of the disclosure have invented a display device capable of touch detection using a vibration generator for generating vibration even without forming touch electrodes in the display panel.

Embodiments of the disclosure can provide a display device in which a plurality of vibration generators for generating a transmission vibration signal and a plurality of receivers for detecting a reception vibration signal are disposed on a display panel, and the touch position can be detected using the reception vibration signal of each receiver.

Embodiments of the disclosure can provide a display device in which the display panel is split into a plurality of blocks, and the touch position can be detected on a per-block basis using at least one vibration generator and a plurality of receivers disposed in each block.

Aspects of the disclosure can provide a display device, comprising a display panel including a first display area and a second display area, a back plate including a first back plate area corresponding to the first display area and a second back plate area corresponding to the second display area, and coupled to a rear surface of the display panel, a plurality of first vibration generators disposed in the first back plate area and vibrating according to a first vibration signal obtained by synthesizing a first sound signal and a first touch driving signal, a plurality of second vibration generators disposed in the second back plate area and vibrating according to a second vibration signal obtained by synthesizing a second sound signal and a second touch driving signal, a plurality of first receivers disposed in the first back plate area to detect the first vibration signal, a plurality of second receivers disposed in the second back plate area to detect the second vibration signal, and a touch circuit determining a position of a touch object from a reception vibration signal detected by the plurality of first receivers and the plurality of second receivers.

Aspects of the disclosure can provide a display device, comprising a display panel including a first display area and a second display area, a back plate including a first back plate area corresponding to the first display area and a second back plate area corresponding to the second display area, and coupled to a rear surface of the display panel, a plurality of first vibration generators disposed in the first back plate area and vibrating according to a first vibration signal obtained by synthesizing a first sound signal and a first touch driving signal, a plurality of second vibration generators disposed in the second back plate area and vibrating according to a second vibration signal obtained by synthesizing a second sound signal and a second touch driving signal, a plurality of first receivers disposed in the first back plate area to detect the first vibration signal, a plurality of second receivers disposed in the second back plate area to detect the second vibration signal, and a touch circuit determining a position of a touch object from a reception vibration signal detected by the plurality of first receivers and the plurality of second receivers.

Aspects of the disclosure can provide a display device, comprising a display panel including a first display area and a second display area, a back plate coupled to a rear surface of the display panel, a first vibration generator disposed in a first back plate area, a second vibration generator disposed in a second back plate area, a plurality of receivers disposed on the back plate, and a touch circuit determining a position of a touch object from a reception vibration signal detected by the plurality of receivers.

According to embodiments of the disclosure, there can be provided a lightweight display device capable of touch detection as no touch electrodes are formed in the display panel.

According to embodiments of the disclosure, a plurality of vibration generators for generating a transmission vibration signal and a plurality of receivers for detecting a reception vibration signal are disposed on a display panel, and the touch position can be detected using the reception vibration signal of each receiver.

According to embodiments of the disclosure, the display panel is split into a plurality of blocks, and the touch position can be detected on a per-block basis using at least one vibration generator and a plurality of receivers disposed in each block.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
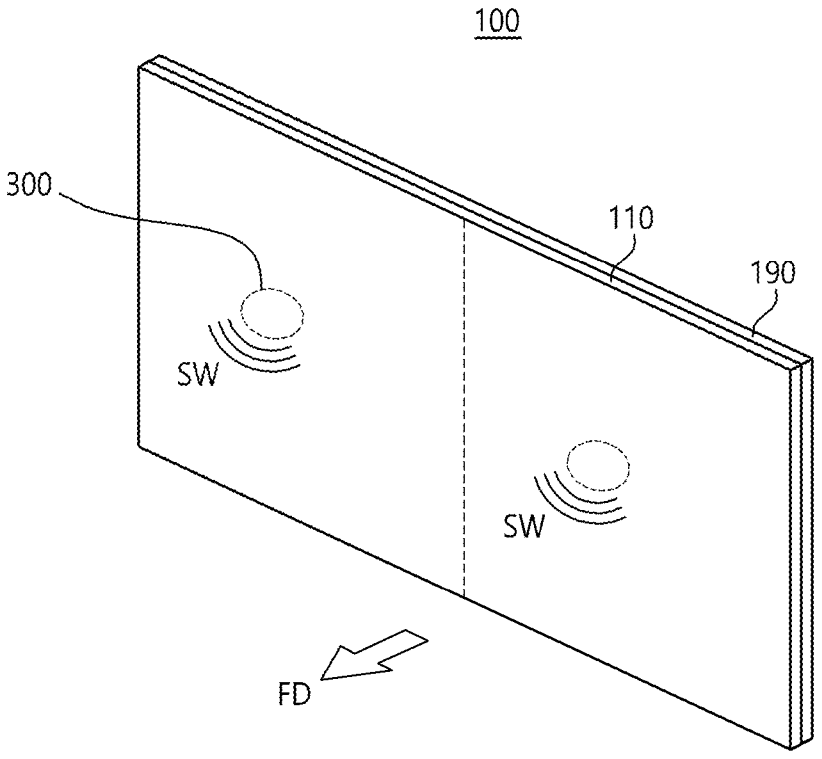
FIG. 1 is a view schematically illustrating a display device according to embodiments of the disclosure.

Hereinafter, some embodiments of the disclosure will be described in detail with reference to example drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of examples or embodiments of the disclosure, detailed descriptions of well-known functions and components incorporated herein will be omitted when it is determined that the description can make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” can be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms can be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term “can” fully encompasses all the meanings of the term “may”.

Hereinafter, various embodiments of the disclosure will be described in detail with reference to the accompanying drawings. All the components of each display device according to all embodiments of the disclosure are operatively coupled and configured.

FIG. 1 is a view schematically illustrating a display device according to embodiments of the disclosure;

Referring to FIG. 1, a display device 100 according to embodiments of the disclosure can include a display panel 110, a back plate 190, and a vibration generator 300 that generates vibration.

The display panel 110 displays an image, and can be implemented as all types of display panels such as a liquid crystal display panel, an organic light emitting display panel, and an electroluminescent display panel.

The display panel 110 can include a subpixel array that displays an image based on the image data. In the subpixel array, data lines and gate lines can intersect, and a plurality of subpixels can be arranged in a matrix form.

Each of the plurality of subpixels can include a red subpixel, a green subpixel, and a blue subpixel to implement a color. Each of the plurality of pixels can further include a white subpixel. However, the present disclosure is not limited thereto, and can include a different combination of color subpixels.

The back plate 190 can be disposed on the rear surface of the display panel 110 to support the display panel 110. Here, a front surface of the display panel 110 can correspond to a surface for displaying an image, and a rear surface of the display panel 110 can correspond to a surface opposite to the front surface.

For example, the back plate 190 can be disposed to be spaced apart from the display panel 110 to support the vibration generator 300 disposed on the back plate 190.

The back plate 190 can cover the entire rear surface of the display panel 110 to be spaced apart from each other, and can have a flat plate shape formed of a glass material, a metal material, or a plastic material. Here, the edge or sharp corner portion of the back plate 190 can have a slope shape or a curved shape by a corner rounding process.

For example, the back plate 190 formed of glass can include sapphire glass. The back plate 190 formed of a metal material can be formed of any one of aluminum, an aluminum alloy, a magnesium alloy, and an alloy of iron and nickel.

As another example, the back plate 190 can have a stacked structure of a metal plate and a glass plate having a relatively smaller thickness than the glass plate and facing the rear surface of the display panel 110. In this case, the rear surface of the display device 100 can be used as a mirror surface by the metal plate.

The vibration generator 300 can be fixed to the back plate 200 to vibrate, and can transfer vibration to the display panel 110 through a vibration transmission member. In other words, the vibration generator 300 can vibrate according to the vibration signal corresponding to the sound signal related to the image with the back plate 190 as a support.

The vibration generator 300 can be a cinematic sound OLED or crystal sound OLED (CSO) that transfers sound using the display panel 110 as a diaphragm.

Accordingly, the display panel 110 can receive the vibration of the vibration generator 300 and output a sound wave SW to the front FD.

The display device 100 can use the display panel 110 vibrating by the vibration generator 300 as a diaphragm to output the sound wave SW to the front FD rather than the rear and lower sides of the display panel 110. Accordingly, the display device 100 can match the positions where the image and the sound are generated to enhance the sense of immersion of the viewer watching the image.

The display device 100 according to the disclosure can have a plurality of receivers disposed on the display panel 110 and determine the touch position by detecting the vibration signal transferred from the vibration generator 300.

Figure 2:
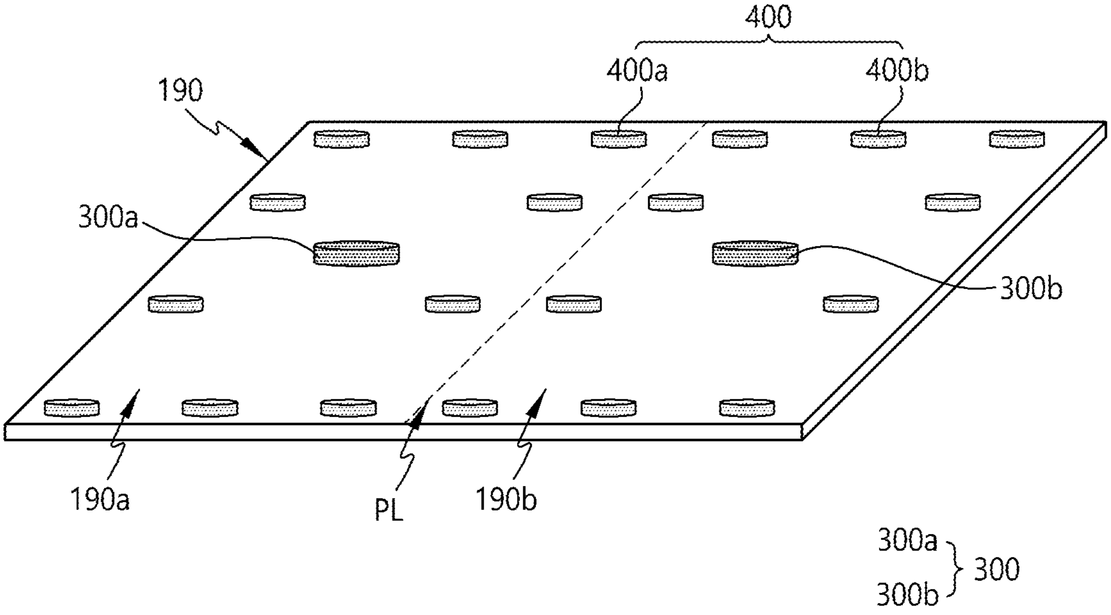
FIG. 2 is a view schematically illustrating an arrangement structure of a vibration generator and a receiver in a display device according to embodiments of the disclosure.

FIG. 2 is a view schematically illustrating an arrangement structure of a vibration generator and a receiver in a display device according to embodiments of the disclosure.

Referring to FIG. 2, in the display device 100 according to embodiments of the disclosure, the vibration generator 300 can include a first vibration generator 300*a* and a second vibration generator 300*b* that vibrate different areas of the display panel 110.

Each of the first vibration generator 300*a* and the second vibration generator 300*b* can be fixed through the back plate 190 and can be disposed to be spaced apart from each other.

For example, the display panel 110 can be divided into a first display area on the left side and a second display area on the right side with respect to the partition line PL. In this case, the first vibration generator 300*a* can be disposed in the center of the first back plate area 190*a* corresponding to the first display area. Further, the second vibration generator 300*b* can be disposed in the center of the second back plate area 190*a* corresponding to the second display area.

Accordingly, the first vibration generator 300*a* can be disposed on the rear surface of the first display area to vibrate the first display area, and the second vibration generator 300*b* can be disposed on the rear surface of the second display area to vibrate the second display area.

The first vibration generator 300*a* and the second vibration generator 300*b* can receive sound signals different and independently generate vibration signals. For example, the first vibration generator 300*a* can generate a sound wave using the first display area as a diaphragm, and the second vibration generator 300*b* can generate a sound wave using the second display area as a diaphragm.

The vibration generator 300, as a speaker, can be a sound actuator, a sound exciter, or a piezoelectric element, but is not limited thereto, and can be a device that outputs sound according to an electrical signal.

The vibration signal generated by the vibration generator 300 can include a touch driving signal for touch sensing as well as a sound signal.

The sound signal can generally have an audible frequency band of 20 Hz to 20 KHz. On the other hand, the touch driving signal for touch sensing can have, e.g., a frequency band between 200 KHz and 400 KHz, which is higher than the audible frequency, e.g., 300 KHz. Accordingly, the vibration generator 300 can generate a transmission vibration signal by synthesizing a sound signal corresponding to an audible frequency band and a touch driving signal for touch sensing.

For example, the first vibration generator 300*a* positioned in the first back plate area 190*a* can generate a first transmission vibration signal in which the first sound signal and the first touch driving signal are synthesized. Further, the second vibration generator 300*b* positioned in the second back plate area 190*b* can generate a second transmission vibration signal in which the second sound signal and the second touch driving signal are synthesized.

In this case, the first sound signal and the second sound signal can be signals of the same frequency.

On the other hand, the frequency of the first touch driving signal and the frequency of the second touch driving signal can be the same frequency or different frequencies.

A plurality of first receivers 400*a* capable of receiving a first transmission vibration signal generated by the first vibration generator 300*a* can be disposed in an outer area of the first back plate area 190*a*. Further, a plurality of second receivers 400*b* capable of receiving the second transmission vibration signal generated by the second vibration generator 300*b* can be disposed in an outer area of the second back plate area 190*b*.

Each of the plurality of first receivers 400*a* can receive the first transmission vibration signal transferred from the first vibration generator 300*a*. The plurality of first receivers 400*a* can separate the touch driving signal from the first reception vibration signal.

In this case, when a touch object such as a finger or a pen (stylus) for a touch is positioned between the first vibration generator 300*a* and the plurality of first receivers 400*a*, the reception vibration signal detected by the first receiver can be changed.

Accordingly, by analyzing the plurality of first reception vibration signals detected by the plurality of first receivers 400*a*, it is possible to detect coordinates at which the touch object such as a finger or a pen is positioned in the first display area.

Similarly, each of the plurality of second receivers 400*b* can receive a second transmission vibration signal transferred from the second vibration generator 300*b*. The plurality of second receivers 400*b* can separate the touch driving signal from the second reception vibration signal.

In this case, when the touch object such as the finger or the pen (stylus) for the touch is positioned between the second vibration generator 300*b* and the plurality of second receivers 400*b*, the reception vibration signal detected by the second receiver can be changed.

Accordingly, by analyzing the plurality of second reception vibration signals detected by the plurality of second receivers 400*b*, it is possible to detect coordinates at which the touch object such as a finger or a pen is positioned in the second display area.

In other words, the display device 100 according to the disclosure can detect coordinates of the touch object positioned on the display panel 110 using the vibration generator 300 and the plurality of receivers 400 disposed in each display area.

Figure 3:
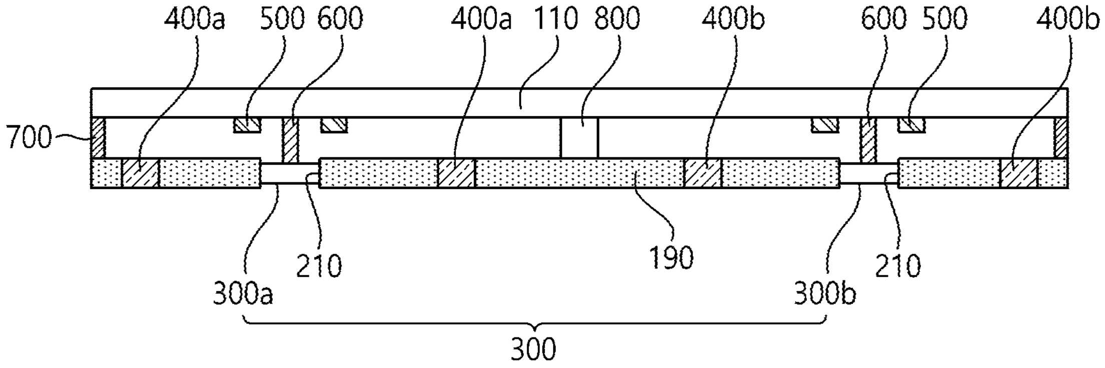
FIG. 3 is a cross-sectional view illustrating a display device according to embodiments of the disclosure.

FIG. 3 is a cross-sectional view exemplarily illustrating a display device according to embodiments of the disclosure.

Referring to FIG. 3, a display device 100 according to embodiments of the disclosure can include a display panel 110 on which an image is displayed and a back plate 190.

The vibration generator 300 and the receiver 400 can be disposed on the back plate 190.

For example, the vibration generator 300 and the receiver 400 can be disposed on the surface of the back plate 190 or can be inserted into a through hole 210 formed in the back plate 190. Here, the vibration generator 300 and the receiver 400 are inserted into the through hole 210 of the back plate 190.

The through hole 210 can be perforated in a circular or polygonal shape in a partial area along the thickness direction of the back plate 190 so that the vibration generator 300 and the receiver 400 can be inserted into the through hole 210.

The vibration generator 300 can be inserted into the through hole 210 to vibrate the display panel 110.

Specifically, the vibration generator 300 can be fixed to the back plate 190 to vibrate, and can transfer vibration to the display panel 110 through the vibration transmission member 600. Accordingly, the vibration generator 300 can vibrate the vibration transmission member 600 by vibrating according to the transmission vibration signal obtained by synthesizing the sound signal and the touch driving signal with the back plate 190 as the support.

The display panel 110 can receive the vibration of the vibration transmission member 600 and output a sound wave SW to the front FD. The display device 100 can output sound to the front of the display panel 110 using the display panel 110 vibrating through the vibration transmission member 600 as a vibration plate, thereby matching the positions of the image of the display device 100 and the generation of the sound.

Further, the plurality of receivers 400 can be inserted into the through hole 210, receive the transmission vibration signal transferred from the vibration generator 300 through the back plate 190, and separate the touch driving signal from the transmission vibration signal to detect the touch position of the touch driving signal according to the amount of change.

The vibration generator 300 and the receiver 400 can be inserted into the through hole 210 of the back plate 190 and may be disposed so as not to protrude to the front surface or the rear surface of the back plate 190. In other words, since the vibration generator 300 and the receiver 400 do not protrude toward the front surface or the rear surface of the back plate 190, the thickness of the display device 100 can be reduced.

The vibration generator 300 can be formed of a piezopolymer including at least one of a polyvinylidene fluoride homopolymer (PVDF homopolymer), a polyvinylidene fluoride copolymer (PVDF copolymer), a polyvinylidene fluoride terpolymer (PVDF terpolymer), a cyanopolymer, a cyano-copolymer, and a boron nitride polymer (BN polymer), but is not limited thereto.

Here, the polyvinylidene fluoride copolymer can be, e.g., PVDF-TrFE, PVDF-TFE, PVDF-CTFE, PVDF-CFE, or the like. The polyvinylidene fluoride terpolymer (PVDF terpolymer) can be PVDFTrFe-CFE, PVDF-TrFE-CTFE, or the like. The cyano-copolymer can be PVDCN-vinyl acetate, PVDCN-vinyl propionate, or the like. The boron nitride polymer (BN polymer) can be polyaminoboran, polyaminodifluoroboran, or the like.

A buffer member 500 can be attached to the display panel 110 to limit the maximum displacement of the vibration generator 300. Specifically, the buffer member 500 can be attached to one surface of the display panel 110 facing the back plate 190 and surround the vibration transmission member 600 so that the buffer member 500 and the vibration transmission member 600 are spaced apart from each other. For example, the buffer member 500 can be attached to the rear surface of the display panel 110.

The buffer member 500 does not overlap the through hole 210 of the back plate 190, but can be disposed in an area adjacent to the through hole 210. For example, the buffer member 500 can be disposed to be maximally adjacent to the through hole 210 and to be maximally spaced apart from the partition member 800.

For example, the buffer member 500 can be attached to the display panel 110 and spaced apart from the back plate 190, and the partition member 800 can be interposed between the display panel 110 and the back plate 190. Accordingly, as the buffer member 500 is spaced apart from the partition member 800, the maximum displacement of the vibration generator 300 inserted into the through hole 210 can be limited when an external impact occurs.

The buffer members 500 can be disposed to be symmetrical to each other with respect to the vibration transmission member 600. In other words, the vibration transmission member 600 can overlap the through hole 210 or the central portion of the vibration generator 300, and the buffer member 500 can be disposed adjacent to the through hole 210 or the vibration generator 300, so that the buffer member 500 can surround the vibration transmission member 600 in a manner that the buffer member 500 and the vibration transmission member 600 are spaced apart from each other.

The thickness of the buffer member 500 can be smaller than the thickness of the partition member 800 interposed between the display panel 110 and the back plate 190. Here, the thickness of each of the buffer member 500 and the partition member 800 can be measured in the same direction as the thickness of each of the display panel 110 and the back plate 190.

The height of the partition member 800 interposed between the display panel 110 and the back plate 190 can be larger than the height of the buffer member 500 attached to the rear surface of the display panel 110. Further, the displacement caused by the vibration of the display panel 110 can be smaller than the distance between the buffer member 500 and the back plate 190.

The partition member 800 can be interposed between the display panel 110 and the back plate 190, and can surround each of the plurality of vibration generators 300*a* and 300*b* so that the plurality of vibration generators 300*a* and 300*b* are spaced apart from each other. For example, the partition member 800 can be disposed to surround the first display area and can be disposed to surround the second display area.

The partition member 800 can block leakage of transmission vibration signals generated from the plurality of vibration generators 300*a* and 300*b*, and can output the sound wave SW only to the front FD of the display panel 110, thereby enhancing sound output characteristics.

An adhesive member 700 can be disposed between the edge of the display panel 110 and the edge of the back plate 190 to bond the display panel 110 and the back plate 190.

The adhesive member 700 can be interposed between the display panel 110 and the back plate 190 to have a predetermined thickness (or height), and can have a sealing structure of a four-sided sealing type or a closed loop type.

The adhesive member 700 is provided between the rear edge of the display panel 110 and the front edge of the back plate 190 to couple the back plate 190 to the rear surface of the display panel 110.

A gap space can be provided between the rear surface of the display panel 110 and the front surface of the back plate 190 by the adhesive member 700. Here, the gap space can be used as a space for vibration of the display panel 110 according to driving of the vibration generator 300.

Figure 4:
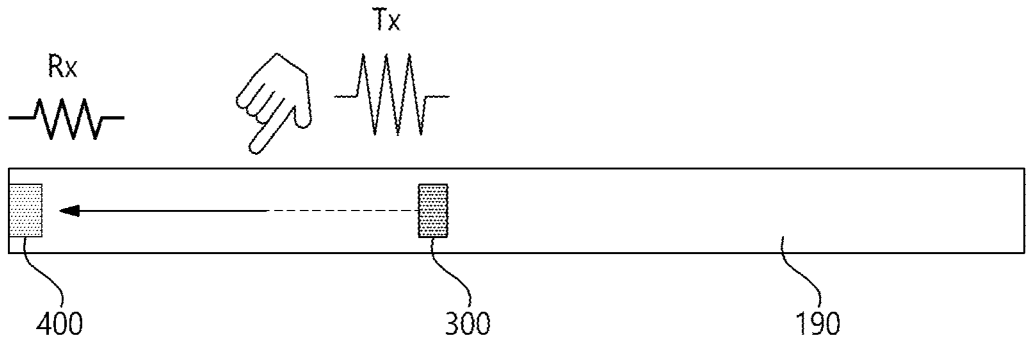
FIG. 4 is a view illustrating a structure in which a vibration signal is transferred through a back plate in a display device according to embodiments of the disclosure.
Figure 5:
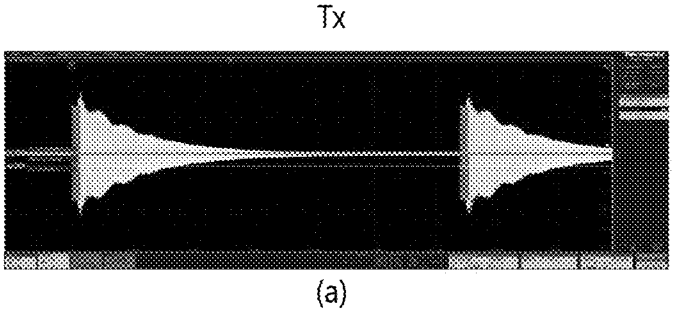
FIG. 5 is a view illustrating an example of a vibration signal transferred through a back plate in a display device according to embodiments of the disclosure.
Figure 5:
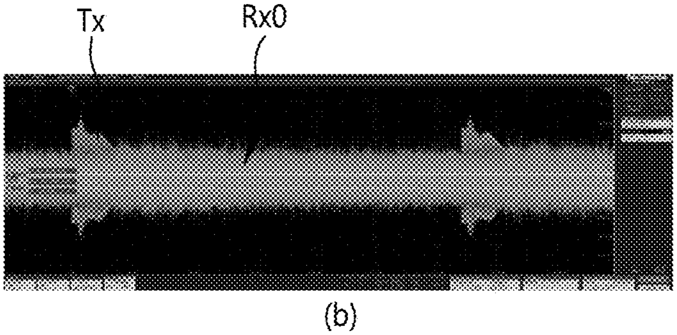

FIG. 4 is a view illustrating a structure in which a vibration signal is transferred through a back plate in a display device according to embodiments of the disclosure. FIG. 5 is a view illustrating an example of a vibration signal transferred through a back plate in a display device according to embodiments of the disclosure.

Referring to FIGS. 4 and 5, the display device 100 according to embodiments of the disclosure can receive a vibration signal transmitted from the vibration generator 300 from the plurality of receivers 400, and can detect a touch position using the vibration signal received from each receiver 400.

The vibration generator 300 and the receiver 400 can be inserted into the back plate 190 positioned on the rear surface of the display panel 110 or can be disposed on the surface of the back plate 190.

When the vibration generator 300 and the receiver 400 are disposed on the back plate 190, the vibration signal generated by the vibration generator 300 can be transferred to the receiver 400 through the back plate 190.

The transmission vibration signal Tx generated by the vibration generator 300 can be a synthesized signal of the sound signal and the touch driving signal (see (a) of FIG. 5).

Accordingly, the transmission vibration signal Tx can have a signal waveform in which a first frequency corresponding to the sound signal and a second frequency corresponding to the touch driving signal are synthesized.

As such, the transmission vibration signal Tx obtained by synthesizing the first frequency and the second frequency can be transferred to the receiver 400 through the back plate 190.

The reception vibration signal Rx received from the receiver 400 can be a signal in which the transmission vibration signal Tx is partially deformed due to the characteristics of the medium of the back plate 190.

Accordingly, the reception vibration signal Rx detected by the receiver 400 in a state in which there is no touch by a touch object (finger, pen, etc.) between the vibration generator 300 and the receiver 400 can be set as a reference vibration signal Rx0, and be compared with the reception vibration signal Rx in a state in which there is a touch by the touch object to thereby determine the touch position of the touch object (see (b) of FIG. 5).

Figure 6:
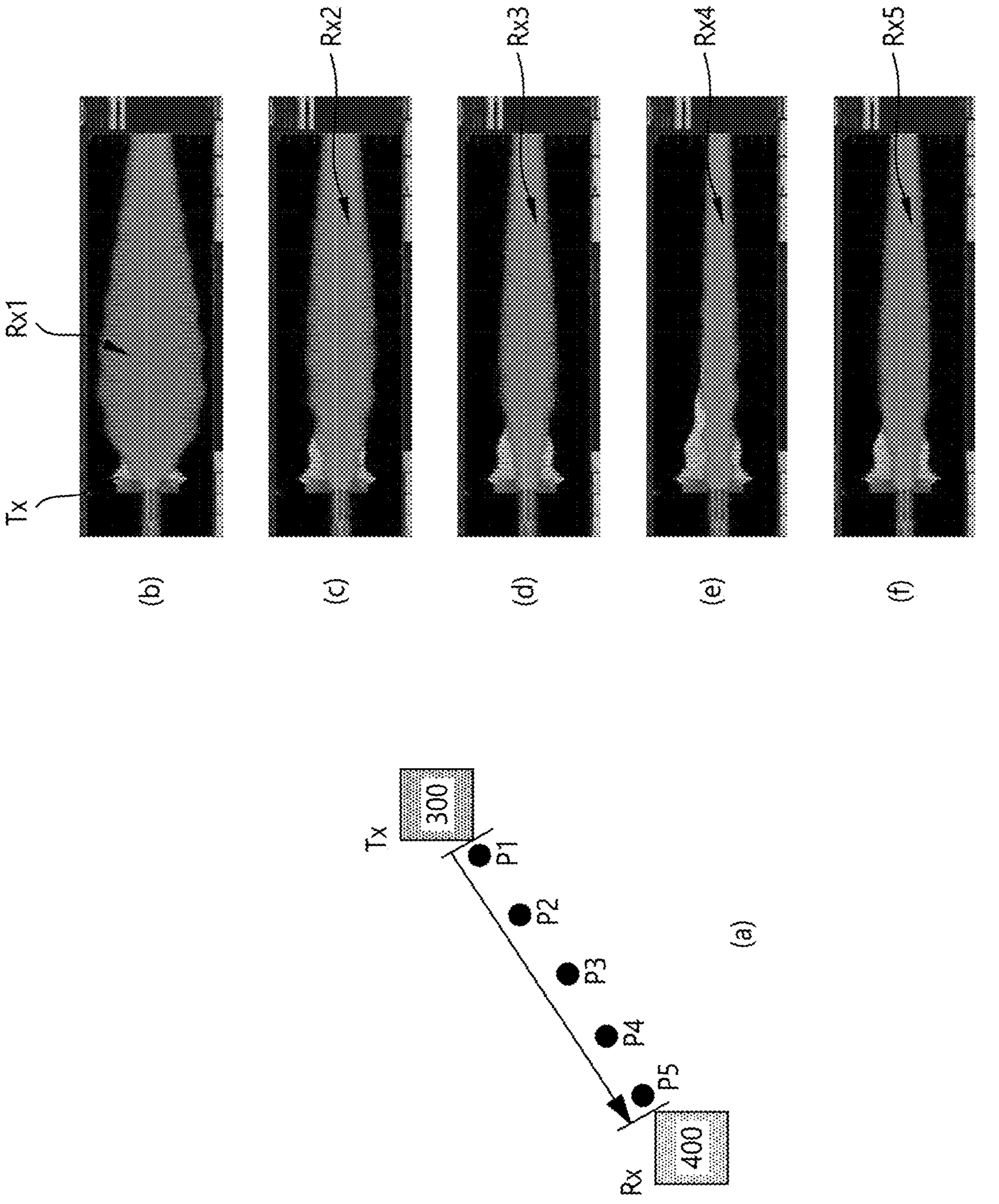
FIG. 6 is a view illustrating a simulation waveform obtained by measuring a variation in reception vibration signal depending on a touch position between a vibration generator and a receiver in a display device according to embodiments of the disclosure.

FIG. 6 is a view illustrating a simulation waveform obtained by measuring a variation in reception vibration signal depending on a touch position between a vibration generator and a receiver in a display device according to embodiments of the disclosure.

Referring to (a) of FIG. 6, in the display device 100 according to embodiments of the disclosure, a transmission vibration signal Tx generated by the vibration generator 300 can be transferred to the receiver 400 through the back plate 190.

The vibration generator 300 can generate the transmission vibration signal Tx by synthesizing a sound signal having a first frequency of an audible frequency band and a touch driving signal having a second frequency for touch sensing.

A reception vibration signal Rx changed while being transferred through the back plate 190 reaches the receiver 400.

When there is no touch object between the vibration generator 300 and the receiver 400, the reception vibration signal detected by the receiver 400 can be the reference vibration signal Rx0.

On the other hand, when there is a touch object between the vibration generator 300 and the receiver 400, the reception vibration signal Rx detected by the receiver 400 can vary depending on the position of the touch object.

For example, five points P1 to P5 having the same interval can be selected in the space between the vibration generator 300 and the receiver 400, and when a touch object is positioned at each point, the reception vibration signal Rx detected by the receiver 400 can be measured (see (a) of FIG. 5).

Further, (b) of FIG. 6 represents a first reception vibration signal Rx1 detected by the receiver 400 when the touch object is positioned at the first point P1 closest to the vibration generator 300, and (c) of FIG. 6 represents a second reception vibration signal Rx2 detected by the receiver 400 when the touch object is positioned at the second point P2. Further, (d) of FIG. 6 represents a third reception vibration signal Rx3 detected by the receiver 400 when the touch object is positioned at the third point P3, and (e) of FIG. 6 represents a fourth reception vibration signal Rx4 detected by the receiver 400 when the touch object is positioned at the fourth point P4. Further, (f) of FIG. 6 represents a fifth reception vibration signal Rx5 detected by the receiver 400 when the touch object is positioned at the fifth point P5.

From the simulation result, it can be identified that the amount of change in the reception vibration signal Rx increases as the touch object is positioned at a position closer to the vibration generator 300.

As described above, the display device 100 of the disclosure can determine the point where the touch object is positioned using the reception vibration signal Rx detected from the receiver 400 disposed in the outer area of the back plate 190.

In this case, by comparing the reception vibration signals Rx detected by the plurality of receivers 400, it is possible to calculate an accurate position of the touch object.

Figure 7:
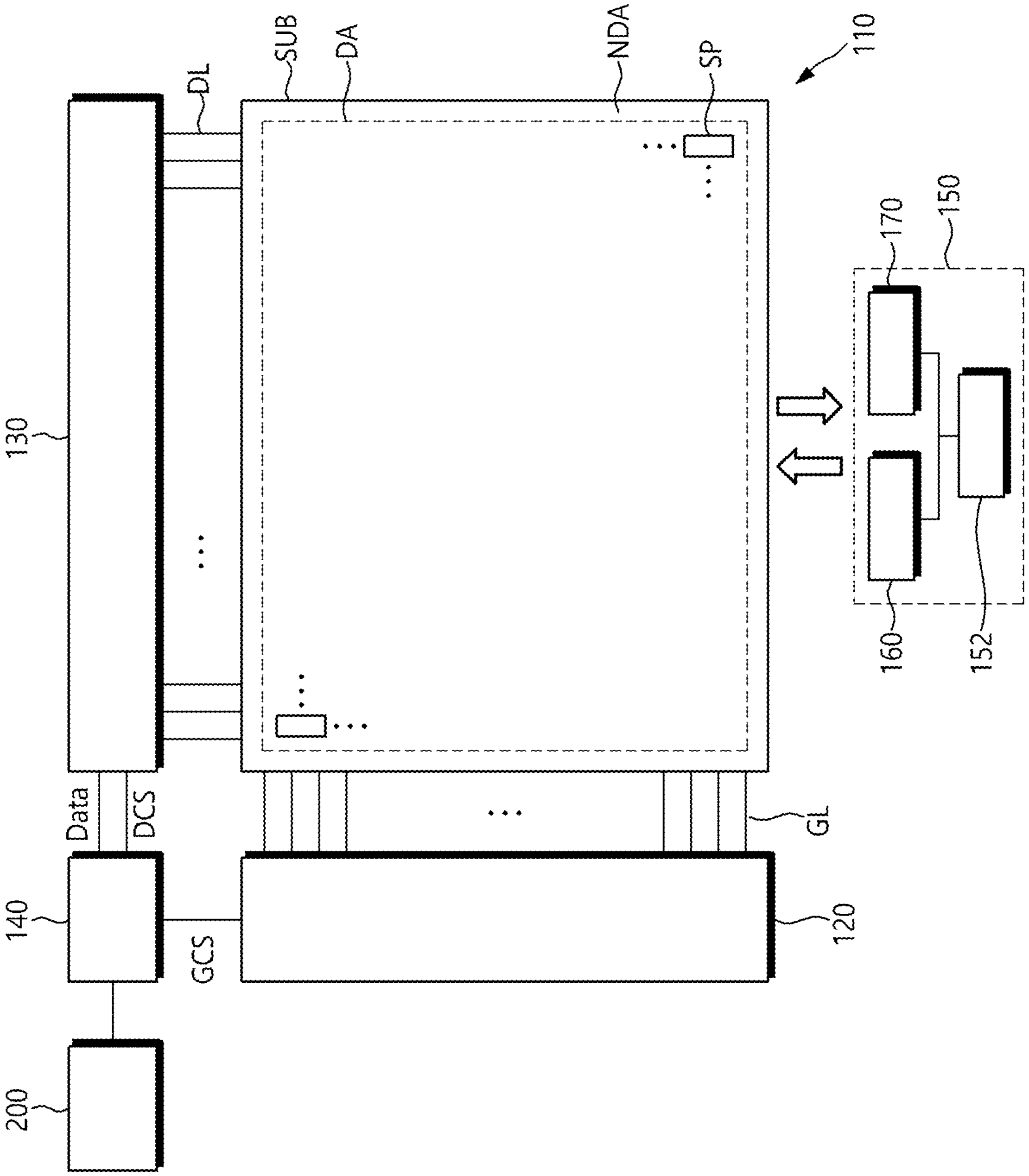
FIG. 7 is a view schematically illustrating a system configuration of a display device according to embodiments of the disclosure.

FIG. 7 is a view schematically illustrating a system configuration of a display device according to embodiments of the disclosure.

Referring to FIG. 7, a display device 100 according to embodiments of the disclosure can include a display panel 110 and display driving circuits, as components for displaying images.

The display driving circuits are circuits for driving the display panel 110 and can include a gate driving circuit 120, a data driving circuit 130, and a timing controller 140.

The display panel 110 can include a display area DA in which images are displayed and a non-display area NDA in which no image is displayed. The non-display area NDA can be an outer area of the display area DA and be referred to as a bezel area. The non-display area NDA can surround the display area DA entirely or only in part(s). The entirety or part of the non-display area NDA can be an area visible from the front surface of the display device 100 or an area that is bent and not visible from the front surface of the display device 100.

The display panel 110 can include a substrate SUB and a plurality of subpixels SP disposed on the substrate SUB. The display panel 110 can further include various types of signal lines to drive the plurality of subpixels SP.

The display device 100 according to embodiments of the disclosure can be a liquid crystal display device or a self-emission display device in which the display panel 110 emits light by itself. When the display device 100 according to the embodiments of the disclosure is a self-emissive display device, each of the plurality of subpixels SP can include a light emitting element.

For example, the display device 100 according to embodiments of the disclosure can be an organic light emitting diode display in which the light emitting element is implemented as an organic light emitting diode (OLED). As another example, the display device 100 according to embodiments of the disclosure can be an inorganic light emitting display device in which the light emitting element is implemented as an inorganic material-based light emitting diode. As another example, the display device 100 according to embodiments of the disclosure can be a quantum dot display device in which the light emitting element is implemented as a quantum dot which is self-emission semiconductor crystal.

The structure of each of the plurality of subpixels SP can vary according to the type of the display device 100. For example, when the display device 100 is a self-emission display device in which the subpixels SP emit light by themselves, each subpixel SP can include a light emitting element that emits light by itself, one or more transistors, and one or more capacitors.

For example, various types of signal lines can include a plurality of data lines DL transferring data signals (also referred to as data voltages or image signals) and a plurality of gate lines GL transferring gate signals (also referred to as scan signals).

The plurality of data lines DL and the plurality of gate lines GL can cross each other. Each of the plurality of data lines DL can be disposed while extending in a first direction. Each of the plurality of gate lines GL can be disposed while extending in a second direction.

Here, the first direction can be a column direction and the second direction can be a row direction. The first direction can be the row direction, and the second direction can be the column direction.

The data driving circuit 130 is a circuit for driving the plurality of data lines DL, and can output data signals to the plurality of data lines DL. The gate driving circuit 120 is a circuit for driving the plurality of gate lines GL, and can supply gate signals to the plurality of gate lines GL.

The timing controller 140 is a device for controlling the data driving circuit 130 and the gate driving circuit 120 and can control driving timings for the plurality of data lines DL and driving timings for the plurality of gate lines GL.

The timing controller 140 can supply a data control signal DCS to the data driving circuit 130 to control the data driving circuit 130 and can supply a gate control signal GCS to the gate driving circuit 120 to control the gate driving circuit 120.

The timing controller 140 can receive input image data from the host system 200 and supply image data Data to the data driving circuit 130 based on the input image data.

The data driving circuit 130 can supply data signals to the plurality of data lines DL according to the driving timing control by the timing controller 140.

The data driving circuit 130 can receive digital image data Data from the timing controller 140 and can convert the received image data Data into analog data signals and output them to the plurality of data lines DL.

The gate driving circuit 120 can supply gate signals to the plurality of gate lines GL according to the timing control of the timing controller 140. The gate driving circuit 120 can receive a first gate voltage corresponding to a turn-on level voltage and a second gate voltage corresponding to a turn-off level voltage, along with various gate control signals GCS, generate gate signals, and supply the generated gate signals to the plurality of gate lines GL.

For example, the data driving circuit 130 can be connected with the display panel 110 by a tape automated bonding (TAB) method or connected to a bonding pad of the display panel 110 by a chip on glass (COG) or chip on panel (COP) method or can be implemented by a chip on film (COF) method and connected with the display panel 110.

The gate driving circuit 120 can be connected with the display panel 110 by TAB method or connected to a bonding pad of the display panel 110 by a COG or COP method or can be connected with the display panel 110 according to a COF method.

Alternatively, the gate driving circuit 120 can be formed in a gate in panel (GIP) type, in the non-display area NDA of the display panel 110. The gate driving circuit 120 can be disposed on the substrate or can be connected to the substrate. In other words, the gate driving circuit 120 that is of a GIP type can be disposed in the non-display area NDA of the substrate. The gate driving circuit 120 that is of a chip-on-glass (COG) type or chip-on-film (COF) type can be connected to the substrate.

Meanwhile, at least one of the data driving circuit 130 and the gate driving circuit 120 can be disposed in the display area DA of the display panel 110. For example, at least one of the data driving circuit 130 and the gate driving circuit 120 can be disposed not to overlap the subpixels SP or to overlap all or some of the subpixels SP.

The data driving circuit 130 can be connected to one side (e.g., an upper or lower side) of the display panel 110. Depending on the driving scheme or the panel design scheme, data driving circuits 130 can be connected with both the sides (e.g., both the upper and lower sides) of the display panel 110, or two or more of the four sides of the display panel 110.

The gate driving circuit 120 can be connected to one side (e.g., a left or right side) of the display panel 110. Depending on the driving scheme or the panel design scheme, gate driving circuits 120 can be connected with both the sides (e.g., both the left and right sides) of the display panel 110, or two or more of the four sides of the display panel 110.

The timing controller 140 can be implemented as a separate component from the data driving circuit 130, or the timing controller 140 and the data driving circuit 130 can be integrated into an integrated circuit (IC).

The timing controller 140 can be a control device that can further perform other control functions. The timing controller 140 can be implemented as various circuits or electronic components, such as an integrated circuit (IC), a field programmable gate array (FPGA), an application specific integrated circuit (ASIC), or a processor.

The timing controller 140 can be mounted on a printed circuit board or a flexible printed circuit and can be electrically connected with the data driving circuit 130 and the gate driving circuit 120 through the printed circuit board or the flexible printed circuit.

The timing controller 140 can transmit/receive signals to/from the data driving circuit 130 according to one or more predetermined interfaces. The interface can include, e.g., a low voltage differential signaling (LVDS) interface, an EPI interface, a serial peripheral interface (SP), and an inter-integrated circuit (I2C).

To provide a touch sensing function as well as an image display function, the display device 100 according to embodiments of the disclosure can include a vibration generator 300 generating a vibration signal, a receiver receiving the vibration signal, and a touch circuit 150 detecting whether a touch occurs by a touch object, such as a finger or pen, or the position of the touch.

The touch circuit 150 can include, e.g., a touch driving circuit 160 controlling the vibration generator 300 to generate a transmission vibration signal TX in which a sound signal and a touch driving signal are synthesized, a touch sensing circuit 170 separating the touch driving signal from the reception vibration signal Rx detected through the receiver 400, and a touch controller 152 controlling the touch driving circuit 160 and the touch sensing circuit 170 to detect an occurrence of a touch or the position of a touch using a touch sensing signal.

The display device 100 according to the disclosure can detect a touch occurrence and a touch position by detecting a transmission vibration signal generated by the vibration generator 300 positioned in the center of the display area from the receiver 400 positioned outside the display area. Accordingly, in the display device 100 according to the disclosure, a touch electrode for touch detection can be omitted.

The touch driving circuit 160 can control the vibration generator 300 positioned on the rear surface of the display panel 110 to generate the transmission vibration signal Tx including the touch driving signal. In this case, the transmission vibration signal Tx can further include a sound signal capable of generating a sound wave SW toward the front of the display panel 110.

The touch sensing circuit 170 can separate the touch driving signal from the reception vibration signal Rx detected from the plurality of receivers 400 disposed outside the display area.

The touch controller 152 can determine the touch occurrence and the touch position based on the amount of change in the touch driving signal separated through the touch sensing circuit 160.

The touch driving circuit 160, the touch sensing circuit 170, and the touch controller 152 included in the touch circuit 150 can be implemented as separate devices or as a single device. Further, the touch circuit 150 and the data driving circuit 130 can be implemented as separate devices or as a single device.

The display device 100 can further include a power supply circuit for supplying various kinds of power to the display driving circuit and the touch circuit 150.

The display device 100 according to embodiments of the disclosure can be a mobile terminal such as a smartphone, a tablet, or the like, or a monitor or a television (TV) of various sizes, but is not limited thereto, and can be a display of various types and various sizes capable of displaying information or an image.

In this case, each subpixel SP arranged on the display panel 110 can include a light emitting element and a circuit element such as a driving transistor for driving the light emitting element.

The type and number of circuit elements constituting each subpixel SP can be varied depending on functions to be provided and design schemes.

Figure 8:
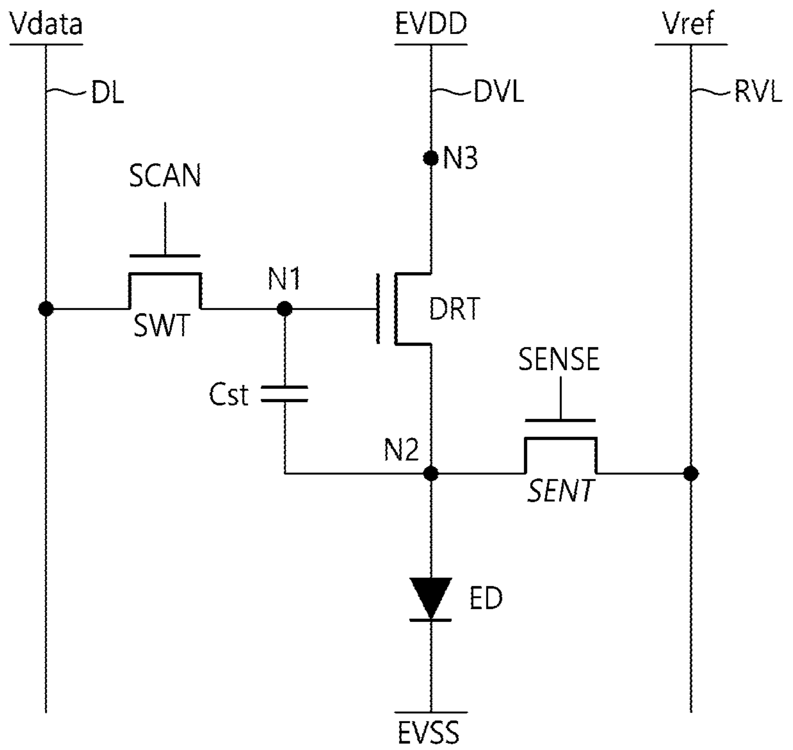
FIG. 8 is a view illustrating an example of a circuit constituting a subpixel in a display device according to embodiments of the disclosure.

FIG. 8 is a view illustrating an example of a circuit constituting a subpixel in a display device according to embodiments of the disclosure.

Referring to FIG. 8, in the display device 100 according to embodiments of the disclosure, the subpixel SP can include one or more transistors and a capacitor and an organic light emitting diode (OLED) as a light emitting element ED.

For example, the subpixel SP can include a driving transistor DRT, a switching transistor SWT, a sensing transistor SENT, a storage capacitor Cst, and a light emitting element ED.

The driving transistor DRT includes the first node N1, second node N2, and third node N3. The first node N1 of the driving transistor DRT can be a gate node to which the data voltage Vdata is applied from the data driving circuit 130 through the data line DL when the switching transistor SWT is turned on. The second node N2 of the driving transistor DRT can be electrically connected with the anode electrode of the light emitting element ED and can be the source node or drain node. The third node N3 of the driving transistor DRT can be electrically connected with the high-potential voltage line DVL to which the high-potential subpixel driving voltage EVDD is applied and can be the drain node or the source node.

In this case, during a display driving period, a subpixel driving voltage EVDD necessary for displaying an image can be supplied to the high-potential voltage line DVL. For example, the subpixel driving voltage EVDD necessary for displaying an image can be 27V.

The switching transistor SWT is electrically connected between the first node N1 of the driving transistor DRT and the data line DL, and the gate line GL is connected to the gate node. Thus, the switching transistor SWT is operated according to the scan signal SCAN supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the sense signal SENSE supplied through the gate line GL. When the sensing transistor SENT is turned on, a sensing reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the light emitting element ED can be supplied.

The gate nodes of the switching transistor SWT and the sensing transistor SENT can be commonly connected to one gate line GL or can be connected to different gate lines GL. An example is shown in which the switching transistor SWT and the sensing transistor SENT are connected to different gate lines GL in which case the switching transistor SWT and the sensing transistor SENT can be independently controlled by the scan signal SCAN and the sense signal SENSE transferred through different gate lines GL.

In contrast, if the switching transistor SWT and the sensing transistor SENT are connected to one gate line GL, the switching transistor SWT and the sensing transistor SENT can be simultaneously controlled by the scan signal SCAN or sense signal SENSE transferred through one gate line GL, and the aperture ratio of the subpixel SP can be increased.

The transistor disposed in the subpixel SP can be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst can also be connected between the first node N1 and third node N3 of the driving transistor DRT depending on the type of the driving transistor DRT. The anode electrode of the light emitting element ED can be electrically connected with the second node N2 of the driving transistor DRT, and a low-potential base voltage EVSS can be applied to the cathode electrode of the light emitting element ED.

The low-potential base voltage EVSS can be a ground voltage or a voltage higher or lower than the ground voltage. The low-potential base voltage EVSS can be varied depending on the driving state. For example, the low-potential base voltage EVSS at the time of display driving and the low-potential base voltage EVSS at the time of sensing driving can be set to differ from each other.

The structure of the subpixel SP described above as an example is a 3T (transistor) 1C (capacitor) structure, which is merely an example for description, and can further include one or more transistors or, in some cases, one or more capacitors. The plurality of subpixels SP can have the same structure, or some of the plurality of subpixels SP can have a different structure.

Figure 9:
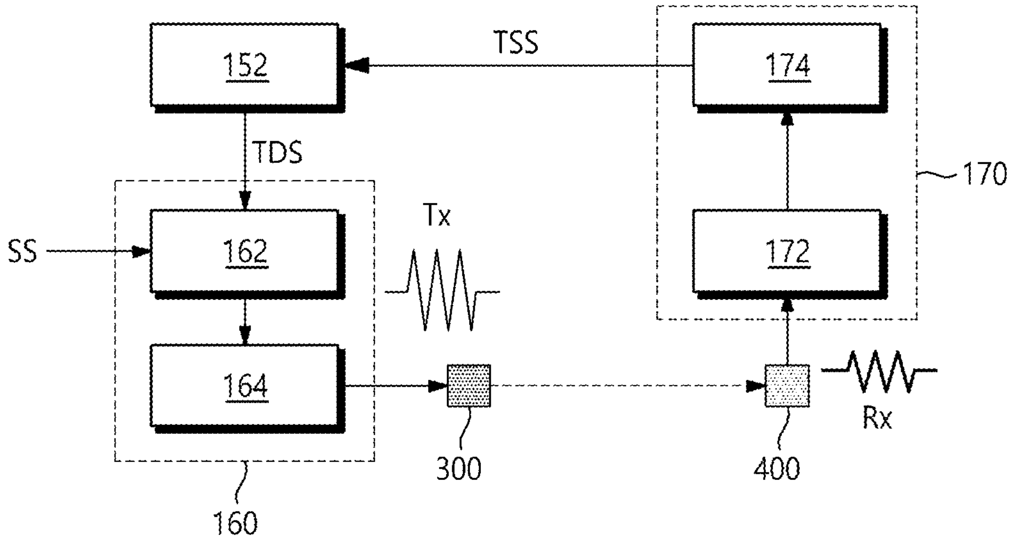
FIG. 9 is a block diagram illustrating an example configuration of a touch circuit for detecting a touch using a vibration signal in a display device according to embodiments of the disclosure.

FIG. 9 is a block diagram illustrating an example configuration of a touch circuit for detecting a touch using a vibration signal in a display device according to embodiments of the disclosure.

Referring to FIG. 9, in the display device 100 according to embodiments of the disclosure, the touch circuit 150 can include a touch driving circuit 160 for generating a transmission vibration signal Tx through the vibration generator 300, and a touch sensing circuit 170 for detecting a touch sensing signal TSS from a reception vibration signal Rx transferred to the receiver 400, and a touch controller 152 for controlling the touch driving circuit 160 and the touch sensing circuit 170.

The touch driving circuit 160 can include a synthesizer 162 for synthesizing an image-related sound signal SS and a touch driving signal TDS and a first amplifier 164.

The sound signal SS is a signal of a first frequency corresponding to an audible frequency band and can be transferred from the timing controller 140.

As a signal of a second frequency for touch sensing of the touch driving signal TDS, it can be transferred from the touch controller 152.

The synthesizer 162 can generate a vibration signal by synthesizing the sound signal SS of the first frequency and the touch driving signal TDS of the second frequency.

The first amplifier 164 amplifies the vibration signal generated by the synthesizer 162 and transfers the transmission vibration signal Tx to the vibration generator 300.

The first amplifier 164 of the touch driving circuit 160 can be omitted.

The vibration generator 300 vibrates the back plate 190 to transfer the transmission vibration signal Tx.

The receiver 400 detects the reception vibration signal Rx transferred through the back plate 190 and transfers the reception vibration signal Rx to the touch sensing circuit 170.

The touch sensing circuit 170 can include a second amplifier 172 and a frequency filter 174.

The reception vibration signal amplified through the second amplifier 170 can separate the touch sensing signal TSS corresponding to the second frequency through the frequency filter 174.

The frequency filter 174 can detect the second frequency (e.g., 300 KHz) corresponding to the touch driving signal TDS and remove the first frequency (audible frequency) corresponding to the sound signal SS.

The touch controller 152 can detect the touch position by analyzing the touch sensing signal TSS of each receiver 400.

As described above, the display device 100 according to the disclosure can receive a vibration signal generated by the vibration generator 300 from the receiver 400 and separate the signal corresponding to the touch frequency from the vibration signal, thereby sensing touch coordinates even without using a touch electrode.

Meanwhile, in the display device 100, the display panel 110 can be divided into a plurality of display areas using the partition member 800 for three-dimensional (3D) sound, and the vibration generator 300 can be disposed in each display area.

In this case, when one vibration generator 300 is disposed in the center of each display area, it can be difficult to accurately detect the touch position according to the separation distance of the receiver 400 disposed outside the display area.

To address this issue, it is possible to enhance the accuracy of touch sensing by disposing a plurality of vibration generators in each display area divided by the partition member 800.

Figure 10:
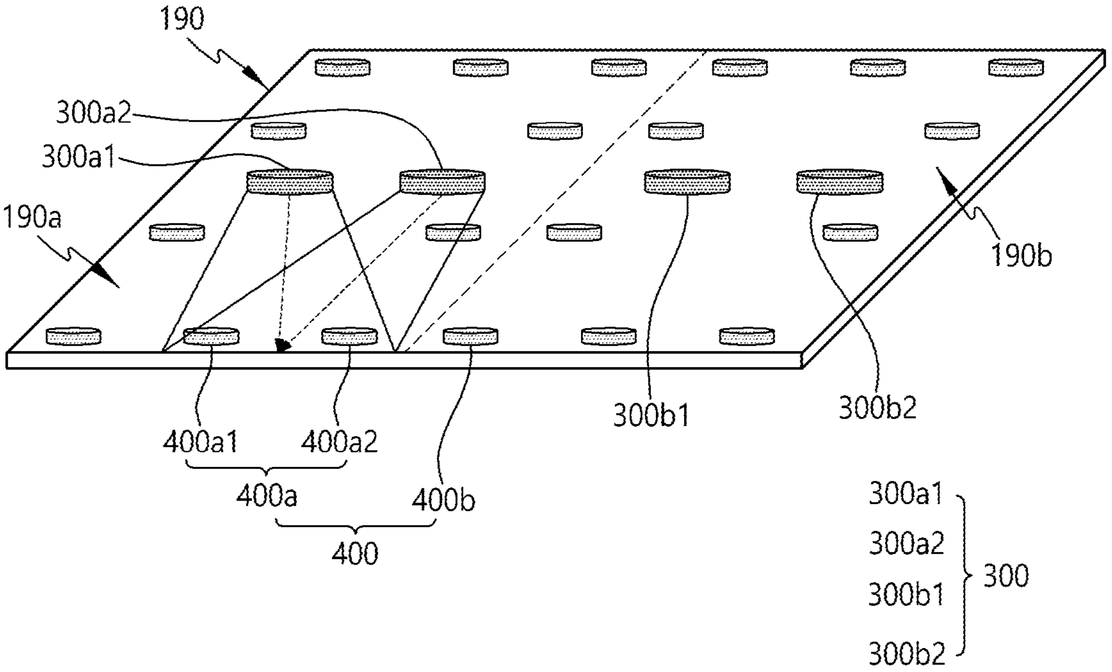
FIG. 10 is a view schematically illustrating another arrangement structure of a vibration generator and a receiver in a display device according to embodiments of the disclosure.

FIG. 10 is a view schematically illustrating another arrangement structure of a vibration generator and a receiver in a display device according to embodiments of the disclosure.

Referring to FIG. 10, a display device 100 according to embodiments of the disclosure can include a display panel 110 on a front surface and a back plate 190 on a rear surface.

The display panel 110 can be divided into a plurality of display areas, and the back plate 190 on the rear surface can be divided into a back plate area corresponding to the display area.

When the display panel 110 is divided into a first display area and a second display area, the back plate 190 can include a first back plate area **190*a* corresponding to the first display area and a second back plate area 190*b*** corresponding to the second display area.

In this case, the vibration generator 300 can include a plurality of first vibration generators **300*al* and 300*a*2 for vibrating the first back plate area 190*a*, and a plurality of second vibration generators 300*b*1 and 300*b*2 for vibrating the second back plate area 190*b***.

The plurality of first vibration generators **300*al* and 300*a*2 can be disposed in the center of the first back plate area 190*a*, and the plurality of second vibration generators 300*b*1 and 300*b*2 can be disposed in the center of the second back plate area 190*b***.

Accordingly, the plurality of first vibration generators 300_al_ and 300_a_2 can be disposed on the rear surface of the first display area to vibrate the first display area, and the second vibration generators 300_b_1 and 300_b_2 can be disposed on the rear surface of the second display area to vibrate the second display area.

The first vibration generators 300_al_ and 300_a_2 and the second vibration generators 300_b_1 and 300_b_2 can receive different sound signals and independently generate vibration signals. For example, the first vibration generators 300_al_ and 300_a_2 can generate sound waves using the first display area as a diaphragm, and the second vibration generators 300_b_1 and 300_b_2 can generate sound waves using the second display area as a diaphragm.

The vibration generator 300, as a speaker, can be a sound actuator, a sound exciter, or a piezoelectric element, but is not limited thereto, and can be a device that outputs sound according to an electrical signal.

The vibration signal generated by the vibration generator 300 can include a sound signal of a first frequency and a touch driving signal of a second frequency.

Accordingly, the vibration generator 300 can generate a transmission vibration signal in which a sound signal corresponding to an audible frequency band and a touch driving signal for touch sensing are synthesized.

A plurality of first receivers 400_a_ capable of receiving a first transmission vibration signal generated by the plurality of first vibration generators 300_al_ and 300_a_2 can be disposed in an outer area of the first back plate area 190_a_. Further, a plurality of second receivers 400_b_ capable of receiving the second transmission vibration signal generated by the plurality of second vibration generators 300_b_1 and 300_b_2 can be disposed in an outer area of the second back plate area 190_b_.

Since a 1-1th vibration generator 300_al_ and a 1-2th vibration generator 300_a_2 are disposed in the center of the first back plate area 190_a_, the plurality of first receivers 400_a_ each receive a plurality of transmission vibration signals.

In this case, a 1-1th transmission vibration signal generated by the 1-1th vibration generator 300_al_ and a 1-2th transmission vibration signal generated by the 1-2th vibration generator 300_a_2 can include touch drive signals of the same frequency or touch driving signals of different frequencies.

For example, the 1-1th receiver 400_al_ may not only receive the vibration signal transferred from the 1-1th vibration generator 300_al_, but also receive the vibration signal transferred from the 1-2th vibration generator 300_a_2. Further, the 1-2th receiver 400_a_2 can also simultaneously receive the vibration signal transferred from the 1-1th vibration generator 300_al_ and the vibration signal transferred from the 1-2th vibration generator 300_a_2.

As such, when a plurality of vibration generators are disposed in the center of each display area, the touch position can be accurately detected because each receiver detects a plurality of reception vibration signals.

The touch driving signal of the second frequency can be separated from the reception vibration signal detected by the plurality of first receivers 400_a_ through the touch sensing circuit. Accordingly, by analyzing the plurality of reception vibration signals detected by the plurality of first receivers 400_a_, it is possible to detect coordinates at which the touch object such as a finger or a pen is positioned in the first display area.

Similarly, the plurality of second receivers 400_b_ can receive vibration signals transferred from the plurality of second vibration generators 300_b_1 and 300_b_2, and the touch sensing circuit can separate the touch driving signal of the second frequency from the reception vibration signals detected from the plurality of second receivers 400_b_.

Accordingly, by analyzing the plurality of reception vibration signals detected by the plurality of second receivers 400_b_, it is possible to detect coordinates at which the touch object such as a finger or a pen is positioned in the second display area.

As such, the display device 100 according to the disclosure can accurately detect coordinates of the touch object positioned on the display panel 110 using the vibration generator 300 and the plurality of receivers 400 disposed in each display area.

Embodiments of the disclosure described above are briefly described below.

A display device according to embodiments of the disclosure can comprise a display panel including a first display area and a second display area, a back plate including a first back plate area corresponding to the first display area and a second back plate area corresponding to the second display area, and coupled to a rear surface of the display panel, a first vibration generator disposed in the first back plate area and vibrating according to a first vibration signal obtained by synthesizing a first sound signal and a first touch driving signal, a second vibration generator disposed in the second back plate area and vibrating according to a second vibration signal obtained by synthesizing a second sound signal and a second touch driving signal, a plurality of first receivers disposed in the first back plate area to detect the first vibration signal, a plurality of second receivers disposed in the second back plate area to detect the second vibration signal, and a touch circuit determining a position of a touch object from a reception vibration signal detected by the plurality of first receivers and the plurality of second receivers.

The first back plate area and the second back plate area can be divided by a partition member disposed on the back plate.

The first vibration generator or the second vibration generator can be inserted into a through hole formed in the back plate.

The first vibration generator or the second vibration generator can transfer vibration to the display panel through a vibration transmission member.

The first vibration generator can be disposed in a center of the first back plate area, and the second vibration generator can be disposed in a center of the second back plate area.

The plurality of first receivers or the plurality of second receivers can be inserted into a through hole formed in the back plate.

The plurality of first receivers can be disposed outside the first back plate area, and the plurality of second receivers can be disposed outside the second back plate area.

The first sound signal and the second sound signal can have the same frequency.

The first touch driving signal and the second touch driving signal can have the same frequency.

The first touch driving signal and the second touch driving signal can have different frequencies.

The touch circuit can include a touch driving circuit including a synthesizer generating a vibration signal by synthesizing a sound signal and a touch driving signal, a touch sensing circuit including a frequency filter separating the touch driving signal from the reception vibration signal, and a touch controller controlling the touch driving circuit and the touch sensing circuit.

The first vibration generator and the second vibration generator can be a sound actuator, a sound exciter, or a piezoelectric element.

The sound signal can have a frequency band of 20 Hz to 20 KHz, and the touch driving signal can have a frequency band between 200 KHz and 400 KHz.

A display device according to aspects of the disclosure can comprise a display panel including a first display area and a second display area, a back plate including a first back plate area corresponding to the first display area and a second back plate area corresponding to the second display area, and coupled to a rear surface of the display panel, a plurality of first vibration generators disposed in the first back plate area and vibrating according to a first vibration signal obtained by synthesizing a first sound signal and a first touch driving signal, a plurality of second vibration generators disposed in the second back plate area and vibrating according to a second vibration signal obtained by synthesizing a second sound signal and a second touch driving signal, a plurality of first receivers disposed in the first back plate area to detect the first vibration signal, a plurality of second receivers disposed in the second back plate area to detect the second vibration signal, and a touch circuit determining a position of a touch object from a reception vibration signal detected by the plurality of first receivers and the plurality of second receivers.

The plurality of first vibration generators can include a plurality of 1-1th vibration generators vibrating according to a 1-1th vibration signal obtained by synthesizing the first sound signal and a 1-1th touch driving signal, and a 1-2th vibration generator vibrating according to a 1-2th vibration signal obtained by synthesizing the first sound signal and a 1-2th touch driving signal.

The plurality of second vibration generators can include a plurality of 2-1th vibration generators vibrating according to a 2-1th vibration signal obtained by synthesizing the second sound signal and a 2-1th touch driving signal; and a 2-2th vibration generator vibrating according to a 2-2th vibration signal obtained by synthesizing the second sound signal and a 2-2th touch driving signal.

A display device according to the disclosure can comprise a display panel including a first display area and a second display area, a back plate coupled to a rear surface of the display panel, a first vibration generator disposed in a first back plate area, a second vibration generator disposed in a second back plate area, a plurality of receivers disposed on the back plate, and a touch circuit determining a position of a touch object from a reception vibration signal detected by the plurality of receivers.

The first vibration generator can vibrate according to a first vibration signal obtained by synthesizing a first sound signal and a first touch driving signal.

The second vibration generator can vibrate according to a second vibration signal obtained by synthesizing a second sound signal and a second touch driving signal.

The plurality of receivers can include a plurality of first receivers disposed outside the first back plate area, and a plurality of second receivers disposed outside the second back plate area.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. For example, the disclosed embodiments are intended to illustrate the scope of the technical idea of the disclosure.

What is claimed is:

1. A display device, comprising:

a display panel including a first display area and a second display area;

a back plate including a first back plate area corresponding to the first display area and a second back plate area corresponding to the second display area, the black plate being coupled to a rear surface of the display panel;

a first vibration generator disposed in the first back plate area and configured to vibrate according to a first vibration signal obtained by synthesizing a first sound signal and a first touch driving signal;

a second vibration generator disposed in the second back plate area and configured to vibrate according to a second vibration signal obtained by synthesizing a second sound signal and a second touch driving signal;

a plurality of first receivers disposed in the first back plate area to detect the first vibration signal;

a plurality of second receivers disposed in the second back plate area to detect the second vibration signal; and a touch circuit configured to determine a position of a touch object from a reception vibration signal detected by the plurality of first receivers and the plurality of second receivers.

2. The display device of claim 1, wherein the first back plate area and the second back plate area are divided by a partition member disposed on the back plate.

3. The display device of claim 1, wherein the first vibration generator or the second vibration generator is inserted into a through hole formed in the back plate.

4. The display device of claim 3, wherein the first vibration generator or the second vibration generator transfers vibration to the display panel through a vibration transmission member.

5. The display device of claim 1, wherein the first vibration generator is disposed in a center part of the first back plate area, and the second vibration generator is disposed in a center part of the second back plate area.

6. The display device of claim 1, wherein the plurality of first receivers or the plurality of second receivers are inserted into a through hole formed in the back plate.

7. The display device of claim 1, wherein the plurality of first receivers are disposed outside of the first back plate area, and the plurality of second receivers are disposed outside of the second back plate area.

8. The display device of claim 1, wherein the first sound signal and the second sound signal have a same frequency.

9. The display device of claim 1, wherein the first touch driving signal and the second touch driving signal have a same frequency.

10. The display device of claim 1, wherein the first touch driving signal and the second touch driving signal have different frequencies.

11. The display device of claim 1, wherein the touch circuit includes:

a touch driving circuit including a synthesizer configured to generate a vibration signal by synthesizing a sound signal and a touch driving signal;

a touch sensing circuit including a frequency filter configured to separate the first or second touch driving signal from the reception vibration signal; and a touch controller configured to control the touch driving circuit and the touch sensing circuit.

12. The display device of claim 1, wherein each of the first vibration generator and the second vibration generator is a sound actuator, a sound exciter, or a piezoelectric element.

13. The display device of claim 1, wherein the sound signal has a frequency band of 20 Hz to 20 KHz, and the touch driving signal has a frequency band between 200 KHz and 400 KHz.

14. A display device, comprising:

a display panel including a first display area and a second display area;

a back plate including a first back plate area corresponding to the first display area and a second back k plate area corresponding to the second display area, the back plate being coupled to a rear surface of the display panel;

a plurality of first vibration generators disposed in the first back plate area and configured to vibrate according to a first vibration signal obtained by synthesizing a first sound signal and a first touch driving signal;

a plurality of second vibration generators disposed in the second back plate area and configured to vibrate according to a second vibration signal obtained by synthesizing a second sound signal and a second touch driving signal;

a plurality of first receivers disposed in the first back plate area to detect the first vibration signal;

a plurality of second receivers disposed in the second back plate area to detect the second vibration signal; and a touch circuit configured to determine a position of a touch object from a reception vibration signal detected by the plurality of first receivers and the plurality of second receivers.

15. The display device of claim 14, wherein the plurality of first vibration generators include:

a plurality of 1-1th vibration generators configured to vibrate according to a 1-1th vibration signal obtained by synthesizing the first sound signal and a 1-1th touch driving signal; and a 1-2th vibration generator configured to vibrate according to a 1-2th vibration signal obtained by synthesizing the first sound signal and a 1-2th touch driving signal.

16. The display device of claim 14, wherein the plurality of second vibration generators include:

a plurality of 2-1th vibration generators configured to vibrate according to a 2-1th h vibration signal obtained by synthesizing the second sound signal and a 2-1th touch driving signal; and a 2-2th vibration generator configured to vibrate according to a 2-2th vibration signal obtained by synthesizing the second sound signal and a 2-2th touch driving signal.

17. A display device, comprising:

a display panel including a first display area and a second display area;

a back plate coupled to a rear surface of the display panel;

a first vibration generator disposed in a first back plate area;

a second vibration generator disposed in a second back plate area;

a plurality of receivers disposed on the back plate; and a touch circuit configured to determine a position of a touch object from a reception vibration signal detected by the plurality of receivers.

18. The display device of claim 17, wherein the first vibration generator vibrates according to a first vibration signal obtained by synthesizing a first sound signal and a first touch driving signal.

19. The display device of claim 18, wherein the second vibration generator vibrates according to a second vibration signal obtained by synthesizing a second sound signal and a second touch driving signal.

20. The display device of claim 17, wherein the plurality of receivers include:

a plurality of first receivers disposed outside of the first back plate area; and a plurality of second receivers disposed outside of the second back plate area.

* * * * *